United States Patent
Park et al.

(10) Patent No.: US 9,814,074 B2
(45) Date of Patent: Nov. 7, 2017

(54) METHOD AND APPARATUS FOR RANDOM ACCESS IN A WIRELESS COMMUNICATION SYSTEM THAT SUPPORTS MULTIPLE CARRIERS

(71) Applicant: LG ELECTRONICS INC., Seoul (KR)

(72) Inventors: Sungjun Park, Anyang-si (KR); Sunghoon Jung, Anyang-si (KR); Seungjune Yi, Anyang-si (KR); Youngdae Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 282 days.

(21) Appl. No.: 14/241,772

(22) PCT Filed: Sep. 27, 2012

(86) PCT No.: PCT/KR2012/007805
§ 371 (c)(1),
(2) Date: Feb. 27, 2014

(87) PCT Pub. No.: WO2013/048137
PCT Pub. Date: Apr. 4, 2013

(65) Prior Publication Data
US 2014/0219204 A1    Aug. 7, 2014

Related U.S. Application Data

(60) Provisional application No. 61/541,098, filed on Sep. 30, 2011, provisional application No. 61/570,249, filed on Dec. 13, 2011.

(51) Int. Cl.
*H04W 4/00*    (2009.01)
*H04W 74/08*   (2009.01)
(Continued)

(52) U.S. Cl.
CPC ....... *H04W 74/0833* (2013.01); *H04L 1/1822* (2013.01); *H04W 74/002* (2013.01); *H04L 5/001* (2013.01)

(58) Field of Classification Search
CPC ........... H04W 74/0833; H04W 74/002; H04L 1/1822
(Continued)

(56) References Cited

U.S. PATENT DOCUMENTS 9,319,909 B2 * 4/2016 Yamada ................. H04W 24/08
2011/0249641 A1 * 10/2011 Kwon ................. H04W 74/0833
370/329
(Continued)

FOREIGN PATENT DOCUMENTS

KR    10-2010-0089876 A    8/2010
KR    10-2010-0105438 A    9/2010
(Continued)

*Primary Examiner* — Thai Hoang
(74) *Attorney, Agent, or Firm* — Dentons US LLP

(57) ABSTRACT

The present invention relates to a wireless communication system. According to one embodiment of the present invention, a method in which a terminal performs a random access procedure comprises the following steps: transmitting a random access preamble to a base station; and receiving, from said base station and as a response to said random access preamble, a random access response message indicated by a physical downlink control channel (PDCCH) for a cell identifier of said terminal.

12 Claims, 10 Drawing Sheets

(51) Int. Cl.
*H04L 1/18* (2006.01)
*H04W 74/00* (2009.01)
*H04L 5/00* (2006.01)

(58) Field of Classification Search
USPC .................................. 370/229–238, 328–349
See application file for complete search history.

(56) References Cited

U.S. PATENT DOCUMENTS

| | | | | |
|---|---|---|---|---|
| 2012/0170497 | A1* | 7/2012 | Zhang | H04W 76/048 370/311 |
| 2012/0287865 | A1* | 11/2012 | Wu | H04W 74/006 370/329 |
| 2012/0300715 | A1* | 11/2012 | Pelletier | H04W 56/0005 370/329 |
| 2012/0300752 | A1* | 11/2012 | Kwon | H04W 56/0005 370/336 |
| 2013/0010711 | A1* | 1/2013 | Larsson | H04W 56/0005 370/329 |
| 2013/0083739 | A1* | 4/2013 | Yamada | H04W 74/006 370/329 |
| 2013/0083747 | A1* | 4/2013 | Narasimha | H04W 74/0841 370/329 |
| 2014/0169323 | A1* | 6/2014 | Park | H04W 72/1289 370/329 |
| 2015/0296509 | A1* | 10/2015 | Yang | H04B 7/26 370/280 |

FOREIGN PATENT DOCUMENTS

| | | |
|---|---|---|
| KR | 10-2011-0086246 A | 7/2011 |
| WO | 2010/143847 A2 | 12/2010 |

* cited by examiner

Component carrier 5 component carriers → 100 MHz

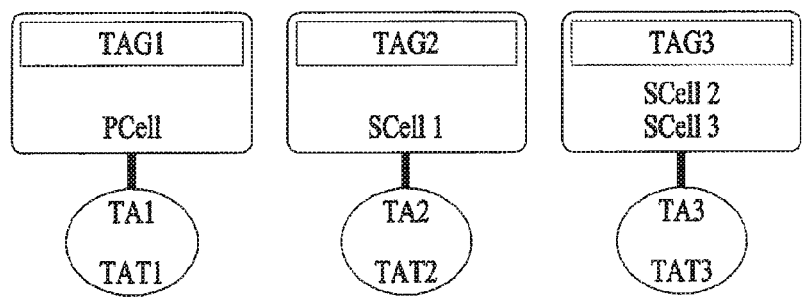

METHOD AND APPARATUS FOR RANDOM ACCESS IN A WIRELESS COMMUNICATION SYSTEM THAT SUPPORTS MULTIPLE CARRIERS

This application is a 35 USC§371 National Stage entry of International Application No. PCT/KR2012/007805, filed Sep. 27, 2012, and claims priority to U.S. Provisional Application Nos. 61/541,098, filed Sep. 30, 2011 and 61/570,249, filed Dec. 13, 2011, each of which are hereby incorporated by reference in its entirety.

TECHNICAL FIELD

The present invention relates to a wireless communication system, and more particularly, to a method of performing a random access in a wireless communication system supportive of multiple carriers and apparatus therefor.

BACKGROUND ART

In a general wireless communication system, although a bandwidth in an uplink and a bandwidth in a downlink are set different from each other, a single carrier is mainly taken into consideration. For instance, based on a single carrier, it is able to provide a wireless communication system having uplink and downlink bandwidths symmetric to each other in general with a single carrier for configuring an uplink and a single carrier configuring a downlink.

In order to support a bandwidth extended more than that of an existing wireless communication system, it is able to apply a carrier aggregation technology for bring an effect of using a logically wind band by combining a multitude of bands together in a frequency region. In a carrier aggregation supportive system, a cell can be understood as a combination of a downlink and an uplink. In defining a cell of a currently defined wireless communication system, an uplink resource is not an essential element. Hence, a cell can be configured with a downlink resource only or both a downlink resource and an uplink resource. The downlink resource can be called a downlink (DL) component carrier (CC). And, the uplink resource can be called an uplink (UL) component carrier (CC). The DL CC and UL CC can be represented as a carrier frequency. And, the carrier frequency means a center frequency of a corresponding cell.

Cells can be categorized into a primary cell (PCell) operating at a primary frequency and a secondary cell (SCell) operating at a secondary frequency. PCell and SCell may be commonly called a serving cell. In brief, the PCell is the cell that becomes a control related center, while the SCell is the rest of the serving cell except the PCell.

A user equipment is able to perform a random access procedure to obtain an uplink transmission timing alignment value or achieve various objects. In an existing wireless communication system, when a base station sends a random access response in response to a random access preamble transmission of a user equipment, information on at least one user equipment is provided through a single random access response. Hence, one user equipment monitors a control channel addressed with a prescribed identifier in a search space configured in common with another user equipment, decodes a data unit transmitted on a data channel indicated by the control channel, and is then able to find a random access response for the corresponding user equipment based on a preamble identifier included in the data unit.

DISCLOSURE OF THE INVENTION

Technical Task

When a plurality of serving cells are configured for a user equipment, a serving cell in which a monitoring on a common search space is not performed may exist among a plurality of the configured serving cells. In this case, on the serving cell in which the monitoring on the common search space is not performed, the user equipment may transmit a random access preamble under the necessity of a random access procedure. In doing so, according to an operation of an existing wireless communication system, a base station transmits a control channel related to a random access response on a common search space. Yet, since the user equipment is unable to monitor it on the serving cell that needs the random access procedure, it may cause a problem that the user equipment is unable to receive the random access response.

The technical task of the present invention is to provide a method and apparatus for a user equipment to obtain a random access response on a serving cell failing to be supported with a monitoring on a common search space correctly and efficiently.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method for a user equipment to perform a random access procedure according to one embodiment of the present invention may include: transmitting a random access preamble to a base station and receiving, from the base station, a random access response message indicated by a physical downlink control channel (PDCCH) for a cell identifier of the user equipment, in response to the random access preamble.

To further achieve these and other advantages and in accordance with the purpose of the present invention, as embodied and broadly described, a method for a base station to support a random access procedure according to another embodiment of the present invention may include: receiving a random access preamble from a user equipment and transmitting, to the user equipment, a random access response message indicated by a physical downlink control channel (PDCCH) for a cell identifier of the user equipment, in response to the random access preamble.

To further achieve these and other advantages and in accordance with the purpose of the present invention, as embodied and broadly described, a user equipment for performing a random access procedure according to another embodiment of the present invention may include a receiving module configured to receive a downlink signal from a base station, a transmitting module configured to transmit an uplink signal to the base station, and a processor controlling the user equipment including the receiving module and the transmitting module. The processor is configured to: transmit a random access preamble to a base station; and receive, from the base station, a random access response message indicated by a physical downlink control channel (PDCCH) for a cell identifier of the user equipment, in response to the random access preamble.

To further achieve these and other advantages and in accordance with the purpose of the present invention, as embodied and broadly described, a base station for supporting a random access procedure according to further embodiment of the present invention may include a receiving module configured to receive an uplink signal from a user equipment, a transmitting module configured to transmit a downlink signal to the user equipment, and a processor controlling the base station including the receiving module and the transmitting module. The processor is configured to: receive a random access preamble from a user equipment; and transmit, to the user equipment, a random access response message indicated by a physical downlink control channel (PDCCH) for a cell identifier of the user equipment, in response to the random access preamble.

The followings may be applicable in common to the above-mentioned embodiments of the present invention.

Preferably, the random access response message may be received through a physical downlink shared channel (PDSCH) indicated by a downlink assignment included in the PDCCH masked with the cell identifier of the user equipment.

Preferably, the random access response may include a TAC (timing advance command) and a TAG (timing advance group) identifier and the TAG identifier may indicate a TAG to which the TAC is applied.

Preferably, the PDCCH may include at least one of indication information indicating that the PDCCH is related to the random access response, or service related information of a data scheduled by the PDCCH.

Preferably, a window for a reception of the random access response may be configured by the base station.

More preferably, a size of the window may be configured UE-specific (user equipment-specific).

Preferably, the random access response may be transmitted by the base station by HARQ (hybrid automatic repeat and request) scheme and a maximum HARQ retransmission count of the random access response may be set up by the base station.

Preferably, a plurality of serving cells may be configured for the user equipment and the random access response may be received on a secondary serving cell (SCell).

More preferably, the PDCCH for the cell identifier of the user equipment may be monitored in a UE-specific search space on the SCell.

More preferably, the random access preamble may be transmitted on the SCell.

More preferably, the SCell may belong to a TAG configured with the SCell only.

Preferably, the cell identifier of the user equipment may include C-RNTI (cell-radio network temporary identifier).

The above-mentioned general description of the present invention and the following details of the present invention are exemplary and may be provided for the additional description of the invention disclosed in claims.

Advantageous Effects

According to the present invention, provided are a method and apparatus for a user equipment to obtain a random access response on a serving cell failing to be supported with a monitoring on a common search space correctly and efficiently.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

FIG. 10 is a diagram to describe a timing advance operation in accordance with a timing advance group (TAG).

FIG. 11 is a diagram for a structure of MAC RAR.

BEST MODE FOR INVENTION

Figure 1:
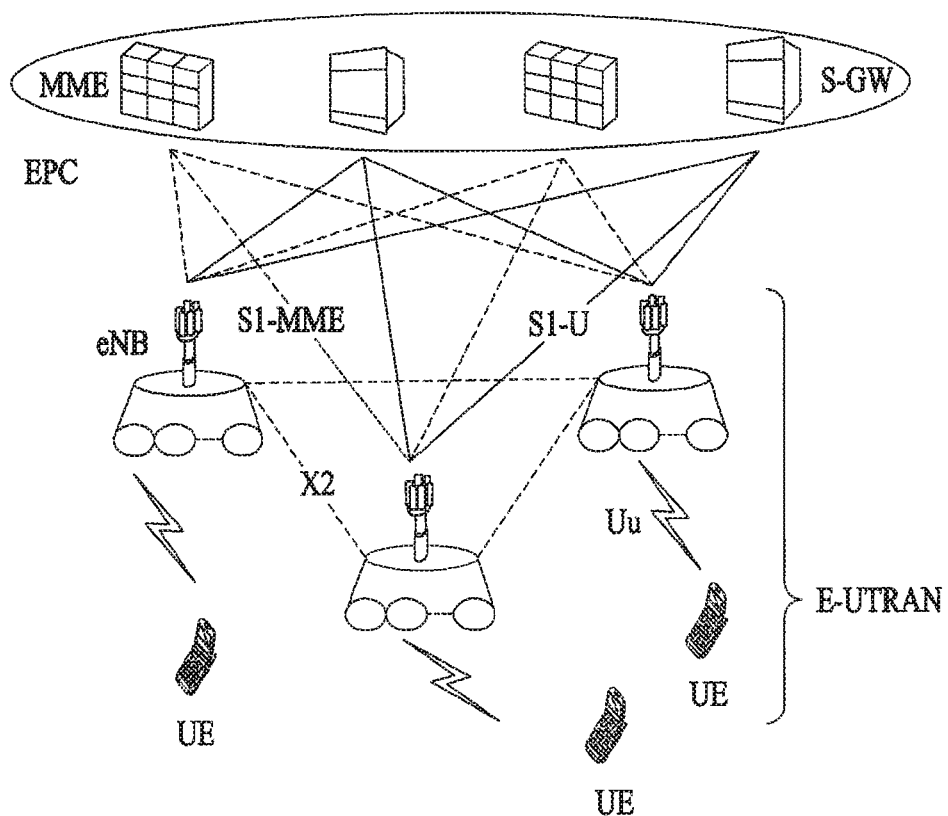
FIG. 1 is a diagram for a structure of a wireless communication system.

First of all, the following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment.

In this specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases.

In particular, in a network constructed with a plurality of network nodes including a base station, it is apparent that various operations performed for communication with a terminal can be performed by a base station or other networks except the base station. 'Base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS) and the like.

Specific terminologies used for the following description may be provided to help the understanding of the present invention. And, the use of the specific terminology may be modified into other forms within the scope of the technical idea of the present invention.

Occasionally, to avoid obscuring the concept of the present invention, structures and/or devices known to the public may be skipped or represented as block diagrams centering on the core functions of the structures and/or devices. Wherever possible, the same reference numbers will be used throughout the drawings to refer to the same or like parts in this specification.

Embodiments of the present invention may be supported by the disclosed standard documents of at least one of wireless access systems including IEEE 802 system, 3GPP system, 3GPP LTE system, and 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE system or 3GPP LTE-A system, by which the technical idea of the present invention may be non-limited.

LTE System Structure

A structure of LTE system as an example of a wireless communication system to which the present invention is applicable is described with reference to FIG. 1 as follows. First of all, LTE system is a mobile communication system evolved from UMTS system. Referring to FIG. 1, an LTE system structure can be mainly divided into an E-URAN (evolved UMTS terrestrial radio access network) and an EPC (evolved packet core). The E-UTRAN consists of a UE (user equipment, terminal) and an eNB (evolved NodeB, base station). A space between the UE and the eNB is called a Uu interface and a space between the eNB and the eNB is called an X2 interface. The EPC consists of an MME (mobility management entity) in charge of a control plane function and an S-GW (serving gateway) in charge of a user plane function. A space between the eNB and the MME is called an S1-MME interface. A space between the eNB and the S-GW is called an S1-U interface. And, the two interfaces may be commonly called an S1 interface.

Figure 2:
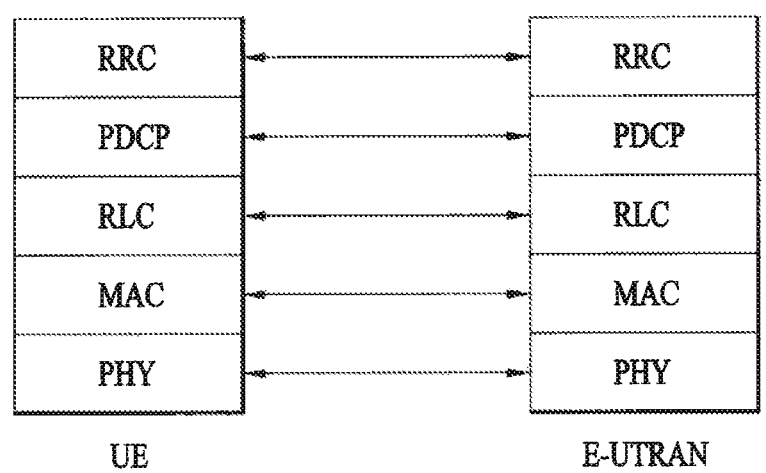
FIG. 2 is a diagram for a control plane of a radio protocol.
Figure 3:
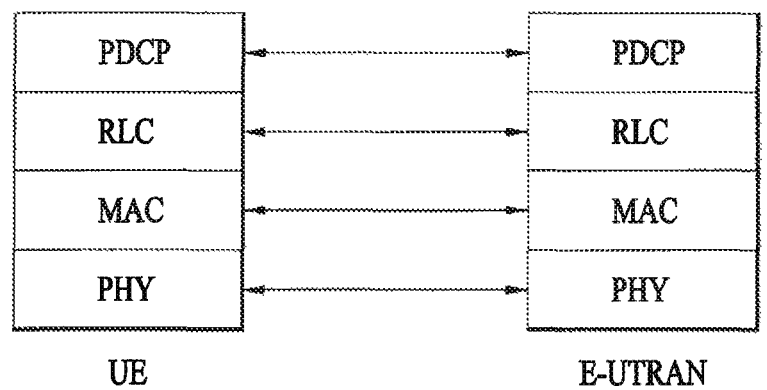
FIG. 3 is a diagram for a user plane of a radio protocol.

A radio interface protocol is defined in the Uu interface that is a radio interval. The radio interface protocol horizontally includes a physical layer, a data link layer and a network layer. And, the radio interface protocol is vertically divided into a user plane for user data transportation and a control plane for signaling (e.g., control signal) delivery. Based on the 3 lower layers of an open system interconnection (OSI) reference model known in communication systems widely and generally, as shown in FIG. 2 and FIG. 3, the radio interface protocol can be divided into L1 (i.e., $1^{st}$ layer) including a physical layer PHY, L2 (i.e., $2^{nd}$ layer) including MAC/RLC/PDCP (medium access control/radio link control/packet data convergence protocol) layer, and L3 (i.e., $3^{rd}$ layer) including RRC (radio resource control) layer. Theses protocol layers exist as pairs in UE (user equipment) and E-UTRAN and are responsible for data transportations of the Uu interface.

The respective radio protocol layers shown in FIG. 2 and FIG. 3 are described as follows. FIG. 2 is a diagram for a control plane of a radio protocol. And, FIG. 3 is a diagram for a user plane of a radio protocol.

Physical (PHY) layer (i.e., $1^{st}$ layer) provides an information transfer service to an upper layer using a physical channel. The PHY layer is connected to a medium access control (MAC) layer above through a transport channel. And, data is transported between the MAC layer and the PHY layer through the transport channel. In this case, the transport channel can be categorized into a dedicated transport channel or a common transport channel depending on whether a channel is shared. And, data is transported between different PHY layers, i.e., a PHY layer of a transmitting side and a PHY layer of a receiving side, through a physical channel using a radio resource.

Various layers exist in the $2^{nd}$ layer as follows. First of all, a medium access control (MAC) layer plays a role in mapping various logical channels to various transport channels, respectively. And, the MAC layer is also responsible for logical channel multiplexing of mapping various logical channels to a single transport channel. The MAC layer is connected to a radio link control (RLC) layer, which is an upper layer, through a logical channel. And, the logical channel is mainly categorized into a control channel for transporting information of a control plane or a traffic channel for transporting information of a user plane depending on a type of the transported information.

The RLC layer of the $2^{nd}$ layer plays a role in adjusting a data size suitable for a lower layer to transmit data in a radio interval by performing segmentation and concatenation on data received from an upper layer. In order to secure various QoS requested by each radio bearer (hereinafter abbreviated RB), three kinds of operating modes, i.e., TM (transparent mode), UM (un-acknowledged mode) and AM (acknowledged mode) are provided. In particular, the AM RLC layer performs a retransmission function through ARQ (automatic repeat and request) function for the reliable data transmission.

A PDCP (packet data convergence protocol) layer of the $2^{nd}$ layer performs a header compression function for reducing an IP packet header size, which is relatively big and carries unnecessary control information, to efficiently transmit such an IP packet as IPv4, IPv6 and the like in a radio interval having a narrow bandwidth. This plays a role in increasing transmission efficiency of a radio interval by transmitting information mandatory for a header part of data only. Moreover, in LTE system, the PDCP layer also performs a security function that includes ciphering for preventing a data wiretap conducted by a stranger and integrity protection for preventing data manipulation conducted by a third party.

A radio resource control (hereinafter abbreviated RRC) layer situated at the top of the $3^{rd}$ layer is defined in a control plane only. The RRC layer is responsible for controlling logical channels, transport channels and physical channels in association with configuration, reconfiguration and release of radio bearers (hereinafter abbreviated RBs). In this case, the radio bearer (RB) means a logical path provided by the $1^{st}$ and $2^{nd}$ layers of the radio protocol for the data transfer between a UE and a UTRAN. Generally, configuring RB means a process for regulating properties of a radio protocol layer and channel required for providing a specific service and setting detailed parameters and operating methods thereof. The RB is categorized into SRB (signaling RB) or DRB (data RB) again. In particular, the SRB is used as a passage for sending an RRC message in a control plane, while the DRB is used as a passage for transporting user data in a user plane.

Carrier Aggregation

Figure 4:
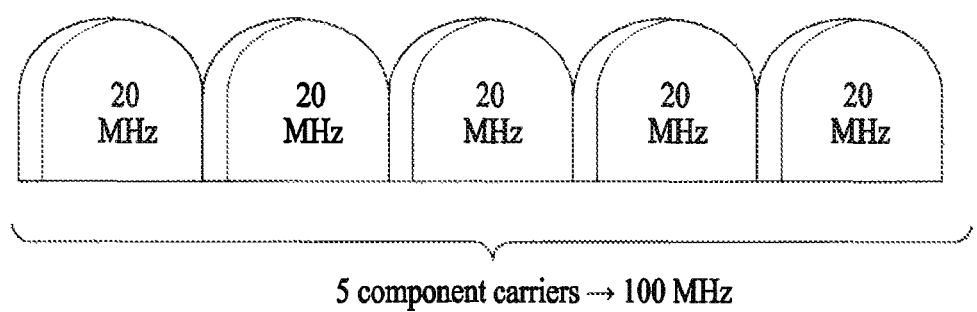
FIG. 4 is a diagram to illustrate carrier aggregation.

Carrier aggregation technology supportive of multiple carriers is described with reference to FIG. 4 as follows.

As mentioned in the foregoing description, carrier aggregation can support system bandwidths up to maximum 100 MHz in a manner of binding maximum 5 carriers (e.g., component carriers, CCs) of bandwidth unit (e.g., 20 MHz) defined in an existing wireless communication system (e.g., LTE system). Bandwidth sizes of component carriers used for carrier aggregation may be equal to or different from each other. Each of the component carriers has a different frequency band (or center frequency). The component carriers may exist on contiguous frequency bands. Yet, component carriers on non-contiguous frequency bands can be used for carrier aggregation. According to the carrier aggregation technology, bandwidth sizes assigned to an uplink and a downlink may be symmetric or asymmetric to each other. In LTE-A system, a serving cell may be configured with a single DL CC and a single UL CC. Alternatively, the serving cell may be configured with a single DL CC, by which the serving cell configuration may be non-limited. For instance, in an advanced or other wireless communication systems, a single cell may be configured with a UL resource only.

In case of applying the carrier aggregation technology, a single RRC connection exists between a user equipment and a base station. A plurality of serving cells configured to be used by a user equipment can be divided into PCell and SCell. The PCell may correspond to a serving cell that provides a security input (e.g., ECGI (E-UTRAN cell global identifier), PCI (physical cell identifier), ARFCN (absolute radio-frequency channel number), etc.) for the establishment or re-establishment of RRC connection and mobility information (e.g., TAI (tracking area identity) of NAS (non-access stratum). And, the SCell may correspond to a cell other than the PCell.

In configuring a plurality of serving cells, PCell is always ready to be used, whereas SCell may be added/released by a base station if necessary. After the SCell has been added, it can be dynamically used depending on a state of activation/deactivation.

Figure 5:
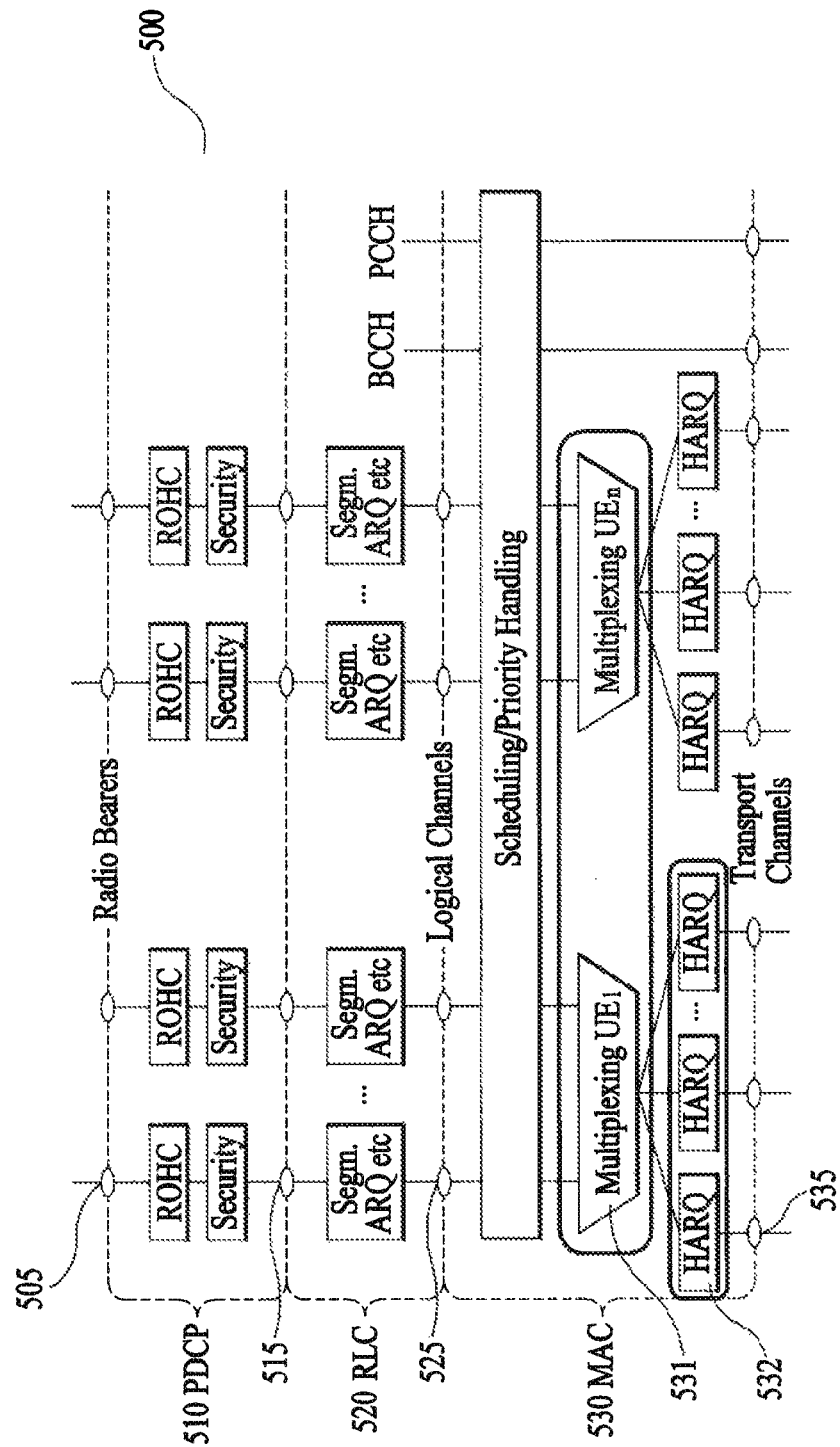
FIG. 5 is a diagram for a structure of a downlink L2 ($2^{nd}$ layer) in carrier aggregation.
Figure 6:
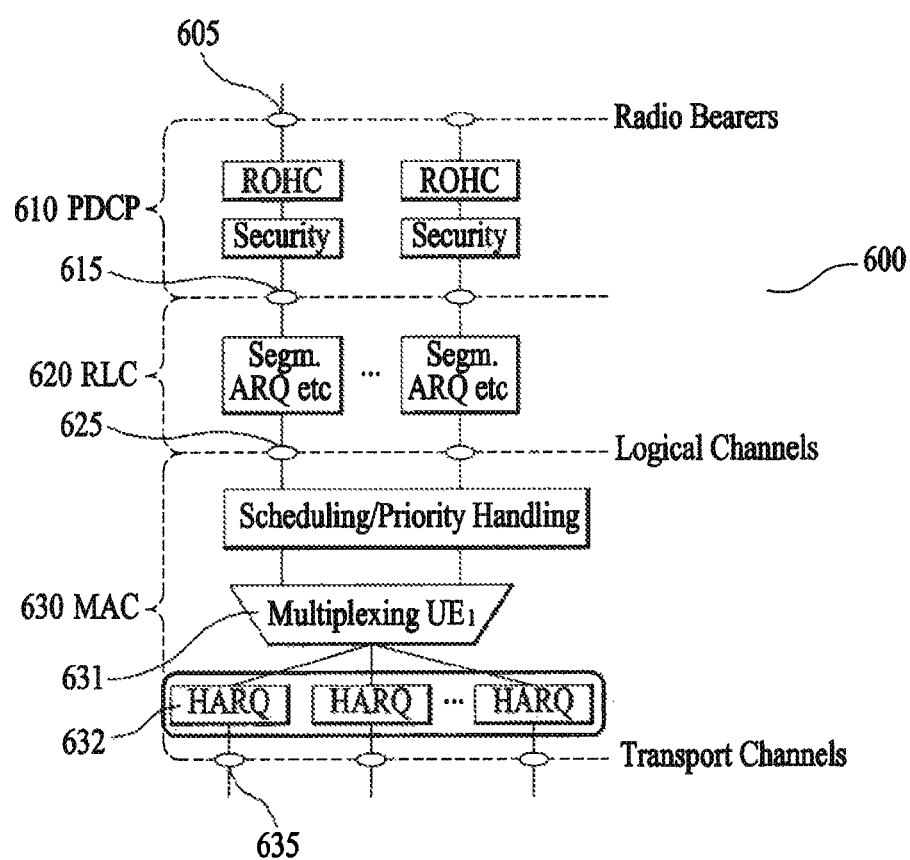
FIG. 6 is a diagram for a structure of an uplink L2 ($2^{nd}$ layer) in carrier aggregation.

Structures of L2 (end layer) in consideration of carrier aggregation technology are described with reference to FIG. 5 and FIG. 6 as follows. FIG. 5 is a diagram for a structure of a downlink L2 ($2^{nd}$ layer) in carrier aggregation, and FIG. 6 is a diagram for a structure of an uplink L2 ($2^{nd}$ layer) in carrier aggregation.

In a DL L2 structure 500 shown in FIG. 5, layers of PDCP 510, RLC 520 and MAC 530 are represented. In FIG. 16, elements 505, 515, 525 and 535 provided to interfaces between the layers indicate service access points (SAP) for peer-to-peer communications. The SAP between PHY channel (not shown in the drawing) and the MAC layer provides a transport channel [535]. And, the SAP between the MAC layer and the RLC layer provides a logical channel [525]. General operations of the respective layers are as good as mentioned in the foregoing description.

The MAC layer multiplexes a plurality of logical channels (i.e., radio bearers) from the RLC layer. In the DL L2 structure, a plurality of multiplexing entities 531 of the MAC layer are related to the application of MIMO (multiple input multiple output) technology. Since one transport channel is generated by multiplexing a plurality of logical channels in case of non-MIMO in a system that does not consider carrier aggregation technology, one HARQ (hybrid automatic repeat and request) entity is provided to one multiplexing entity 531 [not shown in the drawing].

On the other hand, in a system that considers carrier aggregation technology, a plurality of transport channels corresponding to a plurality of component carriers are generated from one multiplexing entity 531. Regarding this, in the carrier aggregation (CA) technology, one HARQ entity 532 manages one component carrier. Hence, the MAC layer 530 of the base station processor, which supports the carrier aggregation technology, provides one multiplexing entity 531 with a plurality of HARQ entities 532 and performs operations related to them. Since each of the HARQ entities 532 handles a transport block independently, a plurality of transport blocks may be simultaneously transmitted/received via a plurality of component carriers.

The UL L2 structure 600 shown in FIG. 6 performs the same operations of the DL L2 structure 500 shown in FIG. 5 except that one multiplexing entity 630 is included in one MAC layer 630. In particular, a plurality of HARQ entities 632 are provided for a plurality of component carriers, operations related to a plurality of the HARQ entities 632 are performed in the MAC layer 630, and a plurality of transport blocks can be simultaneously transmitted/received via a plurality of the component carriers.

Random Access Procedure

A random access procedure performed in LTE system and a case of performing the random access procedure in a CA (carrier aggregation) technology applied system are described in detail as follows.

First of all, in LTE system, a user equipment (UE) can perform a random access procedure in the event of one of the following cases.

Case that a user equipment performs an initial access without a connection (e.g., RRC connection) to a base station Case that a user equipment initially accesses a target cell by a handover procedure Case requested by a command given by a base station

- case that data in uplink is generated in a situation that an uplink time synchronization is not matched or a radio resource used to request a radio resource is not allocated
- case of a recovery process in case of a radio link failure (RLF) or a handover failure In LTE system, a non-contention based random access procedure is provided as follows. First of all, a base station assigns a dedicated random access preamble designated to a specific user equipment. Secondly, the corresponding user equipment a random access procedure using the random access preamble. So to speak, in a process for selecting a random access preamble, there are a contention based random access procedure and a non-contention based random access procedure. In particular, according to the contention based random access procedure, a user equipment randomly selects one random access preamble from a specific set and then uses the selected random access preamble. According to the non-contention based random access procedure, a random access preamble assigned to a specific user equipment is used only. Differences between the two kinds of the random access procedures lie in a presence or non-presence of a contention problem. The non-contention based random access procedure can be used, as mentioned in the foregoing description, only if a handover process is performed or it is requested by a command given by a base station.

Figure 7:
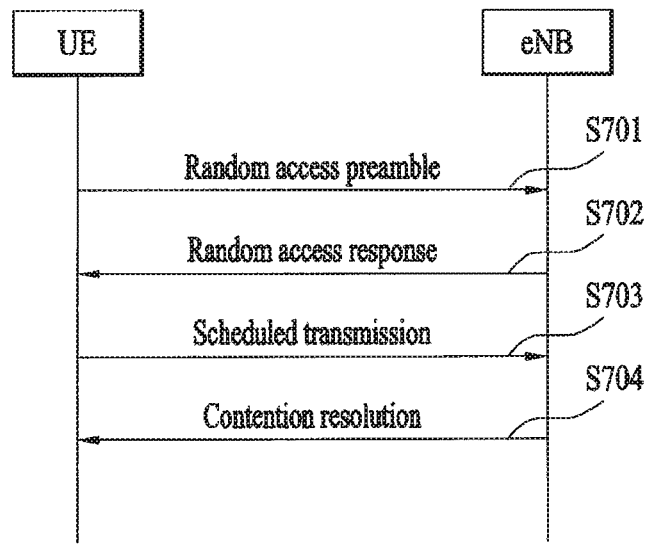
FIG. 7 is a diagram to describe an operating process between a user equipment and a base station in a contention based random access procedure.

FIG. 7 is a diagram to describe an operating process between a user equipment and a base station in a contention based random access procedure.

(1) Transmission of $1^{st}$ Message (Msg1)

First of all, a user equipment randomly selects a random access preamble from a set of random access preambles indicated through a system information or a handover command, selects a PRACH (physical RACH) resource capable of carrying the selected random access preamble, and is then able to transmit the corresponding random access preamble through the selected resource [S701].

(2) Reception of $2^{nd}$ Message (Msg2)

After the user equipment has transmitted the random access preamble in the step S501, it attempts a reception of its random access response within a random access response receiving window indicated through the system information or the handover command from a base station [S702]. In particular, the random access response information can be transmitted in format of MAC PDU. And, the MAC PDU can be delivered through PDSCH (physical downlink shared channel). In order for the user equipment to appropriately receive the information delivered through the PDSCH, the user equipment preferably monitors PDCCH (physical downlink control channel). In particular, information on the user equipment supposed to receive the PDSCH, frequency and time information of a radio resource of the PDSCH, a transmission format of the PDSCH and the like are preferably included in the PDCCH. Once the user equipment successfully receives the PDCCH transmitted to itself, it is able to appropriately receive a random access response transmitted on the PDSCH according to the informations of the PDCCH. And, in the random access response, a random access identifier (ID) (e.g., RAPID (random access preamble identifier), a UL grant indicating a UL radio resource, a temporary cell identifier (temporary C-RNTI (cell-radio network temporary identifier)), etc.) and timing advance commands (TAC) can be included.

As mentioned in the above description, the random access preamble identifier is required for the random access response. The reason for this is described as follows. First of all, since random access response information for at least one or more user equipments may be included in a single random access response, it is necessary to notify that the UL grant, the temporary cell identifier and the TAC are valid for which one of the user equipments. In the present step, assume that the user equipment selects the random access preamble identifier that matches the random access preamble selected by the user equipment.

(3) Transmission of $3^{rd}$ Message (Msg3)

If the user equipment receives the random access response valid for itself, it processes the informations included in the received random access response. In particular, the user equipment applies the TAC and saves the temporary cell identifier. Moreover, the user equipment can save data, which is to be transmitted in response to the reception of the valid random access response, in a message-3 buffer.

Meanwhile, the user equipment transmits data (i.e., a $3^{rd}$ message) to the base station using the received UL grant [S703]. In this case, the $3^{rd}$ message should contain an identifier of the user equipment. In the contention based random access procedure, the base station is unable to determine what kinds of user equipments perform the random access procedure. Hence, in order to resolve the contention in the future, the base station should identify the corresponding user equipment.

The identifier of the user equipment can be included by one of two kinds of methods as follows. First of all, if the user equipment has a valid cell identifier previously assigned by a corresponding cell prior to the random access procedure, the user equipment transmits its cell identifier through a UL transmission signal corresponding to the UL grant. On the contrary, if the user equipment fails in receiving the valid cell identifier prior to the random access procedure, the user equipment transmits its unique identifier (e.g., S-TMSI (S-Temporary Mobile Subscriber Identity), a random ID (Random Id), etc.) inclusively. In generally, the unique ID is longer than a cell identifier. If the user equipment transmits the data corresponding to the UL grant, it starts a contention resolution timer (hereinafter abbreviated 'CR timer').

(4) Reception of $4^{th}$ Message (Msg4)

After the user equipment has transmitted the data containing its identifier through the UL grant included in the random access response, it waits for an indication from the base station for the contention resolution. In particular, the user equipment attempts a reception of the PDCCH in order to receive a specific message [S704]. In receiving the PDCCH, there are two kinds of methods. As mentioned in the foregoing description, if the identifier of the user equipment included in the $3^{rd}$ message transmitted in response to the UL grant is the cell identifier, the user equipment attempts a reception of the PDCCH using its cell identifier. If the identifier is the unique identifier, the user equipment can attempt the reception of the PDCCH using the temporary cell identifier included in the random access response. Thereafter, in the former case, if the user equipment receives the PDCCH through its cell identifier before the expiration of the contention resolution timer, the user equipment determines that the random access procedure has been normally performed and then ends the random access procedure. In the latter case, if the user equipment receives the PDCCH through the temporary cell identifier before the expiration of the contention resolution timer, the user equipment checks data delivered by the PDSCH indicated by the PDCCH. If the unique identifier of the user equipment is included in the substance of the data, the user equipment determines that the random access procedure has been normally performed and then ends the random access procedure.

Figure 8:
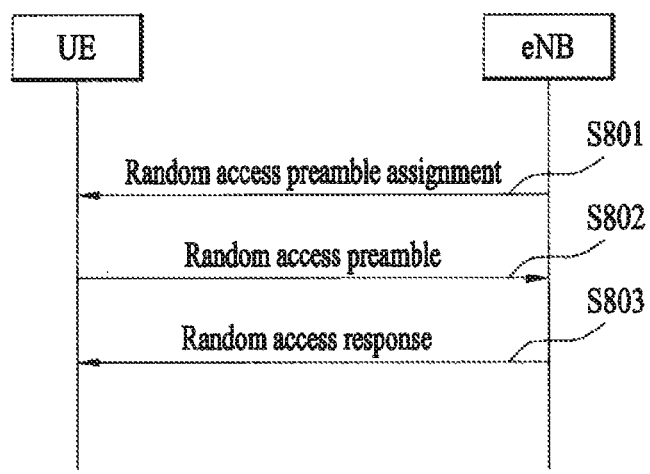
FIG. 8 is a diagram to describe an operating process between a user equipment and a base station in a non-contention based random access procedure.

FIG. 8 is a diagram to describe an operating process between a user equipment and a base station in a non-contention based random access procedure.

Unlike the contention based random access procedure, in an operation of a non-contention based random access procedure, a random access procedure is ended by a transmission of a $1^{st}$ message and a transmission of a $2^{nd}$ message transmission only. Yet, before a user equipment transmits a random access preamble as the $1^{st}$ message to a base station, the base station assigns the random access preamble to the user equipment. Subsequently, the user equipment transmits the assigned random access preamble as the $1^{st}$ message to the base station and then receives a random access response from the base station, whereby the random access procedure is ended.

A non-contention based random access procedure may be performed in case of a handover process. Alternatively, the non-contention based random access procedure may be performed in case of being requested by a command given by a base station. Of course, a contention based random access procedure can be performed in one of the two cases.

(1) Random Access Preamble Assignment

For a non-contention based random access procedure, a dedicated random access preamble having no possibility of contention is assigned by a base station. And, a random access preamble may be indicated by a handover command or a PDCCH command from a base station.

(2) A user equipment transmits the assigned dedicated random access preamble as a $1^{st}$ message to the base station.

(3) A method of receiving a random access response information is identical to that of a contention based random access procedure.

Timing Alignment Maintenance

In LTE system based on OFDM (orthogonal frequency division multiplex) technology, a communication between a user (or a UE) and a base station may interfere with a communication between other users. In order to minimize such interference, it is very important for the base station to manage a transmission timing of the user equipment. In particular, a user equipment can exist in a random area within a cell and a time taken for a data, which is transmitted by the user equipment, to arrive at a base station may differ depending on a location of the user equipment. In more particular, a time taken for a signal transmitted by a user equipment located at a cell edge to arrive at a base station may be relatively longer than a time taken for a signal transmitted by a user equipment located at a cell center to arrive at the base station. On the other hand, a time taken for a signal transmitted by a user equipment located at a cell center to arrive at a base station may be relatively longer than a time taken for a signal transmitted by a user equipment located at a cell edge to arrive at the base station. In aspect of a base station, in order to minimize interference between user equipments, the base station is able to appropriately perform a scheduling on each user equipment in a manner of managing timings of signals, which arrive at the base station by being transmitted from all user equipments in a cell, to coincide with each other (or to belong to a prescribed time boundary). For instance, it is able to manage UL signals, which are transmitted from user equipments, to be received by a base station at the same timing in a manner as follows. First of all, for a user equipment located at a cell edge, a UL transmission timing is adjusted to advance relatively more than a prescribed reference. Secondly, for a user equipment located at a cell center, a UL transmission timing is adjusted to advance relatively less. Such an operation can be called a timing alignment management operation or a timing advance operation.

A random access operation is a sort of a method of a timing advance. In particular, a base station receives a random access preamble transmitted by a user equipment through a random access procedure and is able to calculate a timing advance value to make a transmission timing of a user equipment fast or slow using a reception information of the random access preamble. Through a random access response, the base station informs the user equipment of the calculated timing advance value. The user equipment is then able to update a transmission timing using the corresponding value.

Alternatively, a base station receives SRS (sounding reference signal) transmitted by a user equipment periodically or randomly, calculates a timing advance value of the user equipment using the received signal, and is then able to inform the user equipment of the calculated timing advance value. Subsequently, the user equipment updates a transmission timing of its own.

As mentioned in the foregoing description, a base station measures a transmission timing of a user equipment through a random access preamble or an SRS, calculates a timing value for correction, and is then able to inform the user equipment of the calculated value. Thus, a timing advance value transmitted to a user equipment by a base station, a timing value to be corrected, can be called a timing advance command (TAC). And, the TAC is processed by a MAC layer. Since a user equipment stays at a fixed location all the rime, a transmission timing of the user equipment changes each time depending on a moving speed of the user equipment, a location or the user equipment and/or the like. Considering such a fact, if a user equipment receives a TAC once from a base station, the TAC is not regarded as valid for infinite time. Instead, the TAC should be assumed as valid for a specific time only. To this end, a time alignment timer (TAT) is used. In particular, if a user equipment receives TAC from a base station, the user equipment initiates the TAT. And, assume that a timing of the user equipment is aligned with that of the base station while the TAT is operating only. A value of the TAT can be delivered through a system information or an RRC signal such as a radio bearer reconfiguration and the like. While the TAT is operating, if the user equipment receives a new TAC from the base station, the user equipment re-initiates the TAT. If the TAT expires or does not operate, the user equipment assumes that the timing alignment with the base station is not matched and does not perform a transmission of any uplink data or control signal except a random access preamble (e.g., a data transmission using PUSCH, a transmission of a control signal using PUCCH, etc.).

A Plurality of Timing Advances

In a carrier aggregation supportive system, a plurality of timing advances can be applied to a single user equipment. In case that a plurality of serving cells are configured to a user equipment, since the serving cells can have different frequency properties, respectively, a plurality of timing alignment managements are required. If an uplink transmission is attempted without aligning transmission timings, inter-cell interference may be generated. In LTE system, a timing alignment is managed for each user to reduce inter-user interference. Likewise, in a carrier aggregation system, it is necessary to reduce the inter-cell interference in a manner of appropriately adjusting an uplink transmission timing of each serving cell having a UL CC.

In case that a plurality of serving cells are configured for a user equipment, there may exist some serving cells having similar timing alignment property depending on frequency property among a plurality of the serving cells. For instance, respectively. Moreover, in the scenarios of table 1, assume that F1 is smaller than F2 (i.e., F1<F2).

TABLE 1

Figure 9:
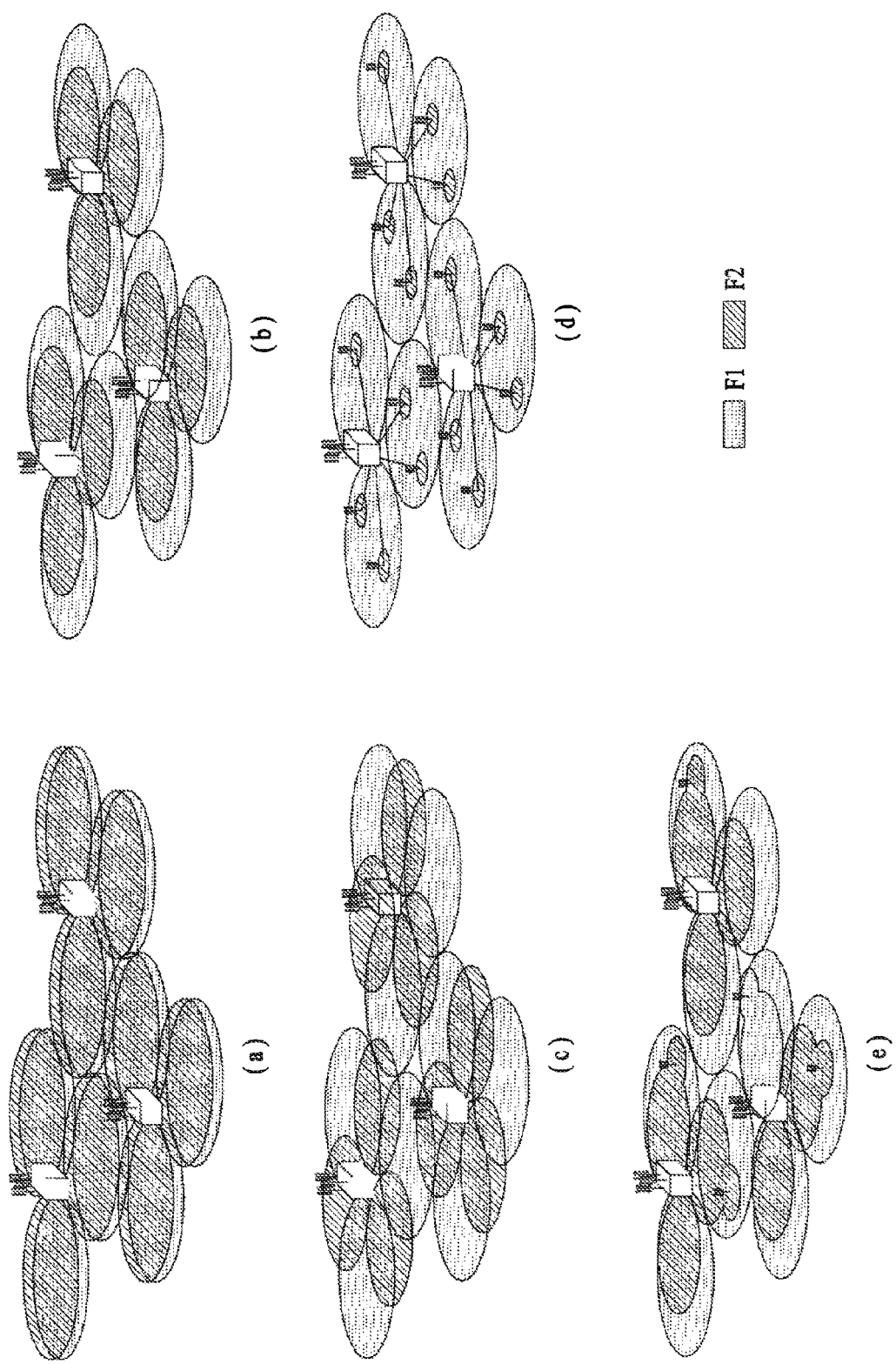
FIG. 9 is a diagram for examples of a deployment scenario of a carrier aggregation system.

| Scenario | Description | Example |
|---|---|---|
| 1 | F1 and F2 exist at the same location in a manner of overlaying each other and provide the almost same coverage. Both cells provide sufficient coverage. And, user's mobility can be provided by each of the cells. Scenario 1 may correspond to a case that F1 and F2 exist on the same frequency band (e.g., 2 GHz band, 800 MHz band, etc.). Carrier aggregation is possible between the overlaid F1 and F2 cells. | FIG. 9 (a) |
| 2 | Although F1 and F2 exist at the same location in a manner of overlaying each other, the F2 has a small coverage due to a large path loss. Only the F1 provides a sufficient coverage, while the F2 is usable for improvement of throughput. It is able to support user's mobility based on the F1 coverage. Scenario 2 may correspond to a case that F1 and F2 exist on different frequency bands (e.g., a case that the F1 exists on 800 MHz band or 2 GHz band and that the F2 exists on 3.5 GHz band), respectively. Carrier aggregation is possible between the overlaid F1 and F2 cells. | FIG. 9 (b) |
| 3 | Although F1 and F2 exist at the same location, an antenna of the F2 is configured to face toward a cell edge of the F1 to improve throughput of a cell edge. Although the F1 provides a sufficient coverage, the F2 can have a potential hole due to a large path loss. It is able to support user's mobility based on the F1 coverage. Scenario 3 may correspond to a case that F1 and F2 exist on different frequency bands (e.g., a case that the F1 exists on 800 MHz band or 2 GHz band and that the F2 exists on 3.5 GHz band), respectively. F1 and F2 of the same base station can be aggregated with each other at the coverage overlaid location. | FIG. 9 (c) |
| 4 | F1 provides a macro coverage and F1 may correspond to an RRH (remote radio head) used to increase throughput at a hot spot. Scenario 4 may correspond to a case that F1 and F2 exist on different frequency bands (e.g., a case that the F1 exists on 800 MHz band or 2 GHz band and that the F2 exists on 3.5 GHz band), respectively. F2 RRH cells can be aggregated with the overlaid F1 macro cells. | FIG. 9 (9) |
| 5 | Although Scenario 5 is similar to Scenario 2, it corresponds to a case that a coverage is extended for one of carrier frequencies as a frequency selective relay is arranged. F1 and F2 of the same base station can be aggregated with each other at the coverage overlaid location. | FIG. 9 (e) | the serving cells within the same frequency band may have the similar timing alignment property. In this case, rather than performing a timing alignment management for each of the serving cells, performing a timing alignment management for each group by grouping the serving cells having the similar timing alignment property may be preferable. For the timing alignment, at least one serving cell can configure at least one group, which can be named a timing advance group (TAG).

A base station is able to inform a user equipment of information indicating each serving cell is included in a prescribed TAG using a TAG identifier of an RRC signal. A single user equipment can have at least two TAGs and at least one or more serving cells having a similar uplink timing alignment property can exist in a single TAG. In case that a plurality of serving cells are included in a single TAG, at least one of the serving cells should have a UL resource (or a UL CC).

Table 1 in the following shows some of scenarios to which carrier aggregation technology can be applied. In the scenarios mentioned in Table 1, 2 serving cells can be named F1 and F2, respectively. And, the F1 and the F2 can be understood as center frequencies of the 2 serving cells, In the examples shown in Table 1, in Scenario 1, since frequency properties of a plurality of serving cells are similar to each other, it is appropriate that the serving cells belongs to a single TAG and that a single timing advance is applied to a user equipment. In Scenarios 2 to 5, since frequency properties of a plurality of serving cells are different from each other, it is appropriate that the serving cells belong to different TAGs, respectively and that a plurality of timing advances are applied to a user equipment.

In the following description, a method of managing a timing alignment for each TAG is explained.

First of all, if a user equipment receives TAC from a base station, the user equipment initiates a TAT. And assume that a timing of the user equipment and a timing of the base station are aligned with each other only if the TAT is operating. In a carrier aggregation system, if a plurality of TAGs are configured for a user equipment, the user equipment manages a timing alignment for each of the TAGs and a TAT then operates for each of the TAGs. In particular, all serving cell(s) in the same TAG applies the same timing advance value. If a TAT expires, it is impossible to perform any uplink transmission through the serving cell(s) of the corresponding TAG except a preamble for a random access.

FIG. 10 is a diagram to describe a timing advance operation in accordance with a timing advance group (TAG).

In the example shown in FIG. 10, assume that 4 serving cells including PCell, SCell1, SCell2 and SCell3 are configured for a user equipment. Each of the SCell2 and the SCell3 having similar timing alignment properties is configured to belong to a same TAG (i.e., TAG3). And, the PCell and the SCell1, of which timing alignment properties are not similar to each other, can be configured to belong to TAG1 and TAG2, respectively. A separate timing advance value and TAT can be given to each of the TAGs.

In the uplink timing alignment management of a user equipment having a plurality of serving cells configured therefor, the following principles can be defined to be followed.

A single timing reference cell for matching a timing alignment exists in each TAG and a different TAT value can be given to each TAG.

A timing alignment management of TAG including PCell follows the timing alignment management defined in an existing wireless communication system (e.g., 3GPP LTE Release-10) and the PCell is referred to.

When a timing alignment is matched on SCell belonging to a TAG failing to include PCell, a random access procedure can be started on a corresponding serving cell (i.e., SCell) by a command given by a base station. In particular, although an uplink transmission is necessary, it is unable to start a random access procedure on SCell without a command of a base station.

When a timing alignment is matched on both PCell and SCell through a random access procedure, a non-contention based random access procedure is performed.

If a TAT of a TAG including PCell does not operate, TAT of the rest of TAG is not able to operate.

By the above-mentioned rules, it is able to apply a timing advance in a wireless communication system supportive of carrier aggregation.

Enhanced Random Access Procedure

In case that a plurality of TAGs are configured for a user equipment, assume a case that a TAG constructed with SCell only exists. In this case, for an uplink timing alignment (or time synchronization) for the TAG constructed with SCell only, it is able to perform a random access procedure on SCell. After a user equipment has transmitted a random access preamble to a base station, it should receive a random access response (RAR) in response to the transmitted random access preamble. In receiving the RAR, according to a related art, a user equipment can receive MAC RAR carried on PDSCH indicated by PDCCH by monitoring the PDCCH masked with RA-RNTI (Random Access-RNTI).

Location candidates for enabling a user equipment to find PDCCH are called a search space. In particular, the search spaces can be defined in a manner of being sorted into a common search space and a UE-specific search space. The common search space is identically configured for all user equipments, whereas the UE-specific search space is individually configured for each user equipment. As mentioned in the foregoing description, according to a related art, since RAR information for at least one or more user equipments can be included in a single RAR, PDCCH (i.e., PDCCH masked with RA-RNTI according to a related art) indicating PDSCH including RAR is transmitted on the common search space. Hence, in order to receive the PDCCH masked with the RA-RNTI, it is necessary to monitor the common search space. On the other hand, since a cell-identifier (e.g., C-RNTI (cell-radio network temporary identifier) of a user equipment is the identifier given UE-specifically, the PDCCH masked with the C-RNTI is transmitted on the UE-specific search space. Hence, in order for a user equipment to find a PDCCH transmission addressed with C-RNTI, a UE-specific search space should be monitored.

In case of a user equipment having one excessive serving cell configured therefor (i.e., a user equipment operating in a carrier aggregation environment), monitoring on a common search space is performed not on SCell but on PCell. In particular, the user equipment does not monitor the common search space but monitors the UE-specific search space only. Hence, the user equipment is unable to receive PDCCH, which is transmitted through the common search space on PCell in a manner of being masked with RA-RNT, on SCell, thereby being unable to correctly receive an RAR message transmitted on PDSCH indicated by the PDCCH masked with the RA-RNTI. Thus, if an existing random access procedure is exactly applied to a random access procedure on SCell in a TAG including SCell only, it causes a problem that a user equipment is unable to receive a random access response correctly.

Hence, in order for a user equipment to correctly receive an RAR in a random access procedure on SCell, the present invention proposes to use an RAR for PDCCH (i.e., PDCCH addressed with C-RNTI) masked with a cell identifier of the user equipment. Since the C-RNTI is an identifier given UE-specifically, the C-RNTI is identically used for all serving cells (i.e., PCell and SCell(s)) configured for a single user equipment. Hence, the user equipment monitors and decodes the PDCCH masked with the C-RNTI in the UE-specific search space on SCell and is then able to receive an RAR message through PDSCH indicated by the PDCCH masked with the C-RNTI. In the following description, methods of receiving an RAR using PDCCH masked with C-RNTI according to embodiments of the present invention are explained.

FIG. 11 is a diagram for a structure of MAC RAR. FIG. 11(a) corresponds to a structure of an existing MAC RAR. And, FIG. 11(b) shows a MAC RAR structure of a new type proposed by the present invention.

In FIG. 11(a), a MAC RAR consists of 4 fields (i.e., R, TAC, UL grant and temporary C-RNTI). The R field is a reserved bit and has 1-bit size. The TAC, UL grant and temporary C-RNTI fields can refer to the former description of the Msg2 part with reference to FIG. 7.

FIG. 11(b) shows one example of a MAC RAR structure of a new type proposed by the present invention. The new MAC RAR proposed by the present invention can include a TAC field and a UL grant field. In addition, the new MAC RAR can include a TAG identifier (TAG ID). The TAG identifier is the information indicating a TAG to which a TAC received by a user equipment though a MAC RAR is applied. The TAG ID field can be configured with a 1-bit size. As mentioned in the foregoing description, the R field indicates a reserved bit.

The new MAC RAR may not include a temporary C-RNTI. The reason for this is described as follows. First of all, since a user equipment already has a C-RNTI and an RAR is provided UE-specifically using the C-RNTI, it is not mandatory for the user equipment to perform a contention resolution process through the transmission of Msg3 and the reception of Msg4. Moreover, in case that a random access procedure is restricted to operate on the basis of non-contention on SCell, a reception of the MAC RAR terminates the random access procedure and the user equipment needs not to be provided with the temporary C-RNTI.

In an existing random access procedure, a user equipment attempts a reception of its RAR within an RAR window indicated through a system information or a handover command from a base station. In particular, a size of the RAR window defined in the existing random access procedure is not given UE-specifically but is a value given in common to several user equipments. And, the RAR window is defined as having a length of the RAR window size value by starting after a prescribed subframe from a preamble transmission completed subframe. On the other hand, the RAR window related to the reception of the new MAC RAR proposed by the present invention can be given UE-specifically. For instance, a value for defining an interval of the RAR window can be set through upper layer signaling (e.g., RRC signaling) from the base station. For instance, a value for the RAR window size can be given by UE-specific upper layer signaling.

Moreover, the PDCCH masked with the C-RNTI, which is proposed by the present invention, can include an indicator (hereinafter named RAR in brief) indicating whether it is related to an RAR message. In particular, the PDCCH masked with the C-RNTI of the user equipment may include scheduling information on PDSCH. And, the PDSCH can carry a prescribed downlink message. In this case, information (i.e., RAR indicator) indicating whether the prescribed downlink message is the RAR message can be included in the C-RNTI masked PDCCH. Hence, before the user equipment decodes the downlink message delivered through the PDSCH indicated by the PDCCH (or irrespective of a result of the decoding), the user equipment can determine whether the PDCCH is provided for the transmission of the RAR message. Hence, the user equipment can perform an accurate and efficient operation by discriminating whether the PDCCH monitored on the UE-specific search space on SCell is for PAR or corresponds to a PDCCH for another usage.

The RAR indicator can be included in the PDCCH in a manner of reusing a specific field in a DL control information (DCI) transmitted on the PDCH or defining a new field. Alternatively, it is able to indicate whether the corresponding PDCCH is related to the RAR in various ways.

A type of a service of data (i.e., data transmitted through the PDSCH indicated by the PDCCH) related to the PDCCH, a service level, a service quality or an identifier of a radio bearer may be included in the PDCCH. Hence, the user equipment obtains a type of the downlink message included in the PDSCH indicated by the PDCCH and is then able to operate correspondingly.

A base station transmits RAR and is then able to receive an HARQ acknowledgement/non-acknowledgement response from a user equipment in response to the RAR. Since an RAR message of the present invention uses PDCCH masked with C-RNTI of a user equipment, a base station is able to use HARQ in transmitting the RAR message to the user equipment. According to the HARQ, a data transmitting side can perform an HARQ retransmission depending on a feedback transmitted by a data receiving side. If the HARQ acknowledgement/non-acknowledgement response from the user equipment in response to the RAR transmitted by the base station is non-acknowledgement, the base station can perform HARQ retransmission for the RAR.

The present invention proposes that a base station informs a user equipment of a Maximum HARQ retransmission count for RAR. For instance, the base station can set the Maximum HARQ retransmission count for the RAR and is then able to inform the user equipment of the set count through upper layer signaling (e.g., RRC signaling). Hence, if the user equipment receives the RAR from the base station using PDCCH masked with C-RNTI of the user equipment, the user equipment can be aware how many HARQ retransmissions occur to the maximum and is then able to correctly attempt a reception of the RAR retransmission. In case that a transmitting environment from the base station to the user equipment is not good, the RAR retransmissions are attempted as many as a prescribed maximum count instead of being repeated infinitely, whereby waste of resources can be prevented.

Accordingly, after a user equipment has transmitted a random access preamble to a base station, it is able to generally apply the aforementioned examples of the present invention as conditions for checking whether an RAR message is successfully received. For instance, the user equipment monitors and decodes PDCCH masked with a cell identifier (e.g., C-RNTI) of the user equipment within an RAR window configured by the base station. If the PDCCH includes an RAR indicator and the user equipment successfully decodes the RAR message transmitted by the base station under a maximum RAR HARQ retransmission count set up by the base station, the user equipment can regard the RAR message as successfully received.

Although the user equipment has received an initial RAR message within the RAR window, if the user equipment fails in decoding of the corresponding RAR message and feeds NACK back, the user equipment can recognize that there will be RAR retransmission from the base station under the Maximum HARQ retransmission count. Hence, the user equipment can attempt the reception of the RAR retransmission after expiration of the RAR window. In case that the RAR indicator is included in the PDCCH, since the user equipment can clearly recognize that the PDSCH indicated by the corresponding PDCCH carries the RAR message, although RAR information is not obtained due to the PDSCH decoding failure and the RAR window expires, the user equipment expects that RAR will be retransmitted under the Maximum HARQ retransmission count and is then able to attempt the reception of the RAR retransmission.

Figure 12:
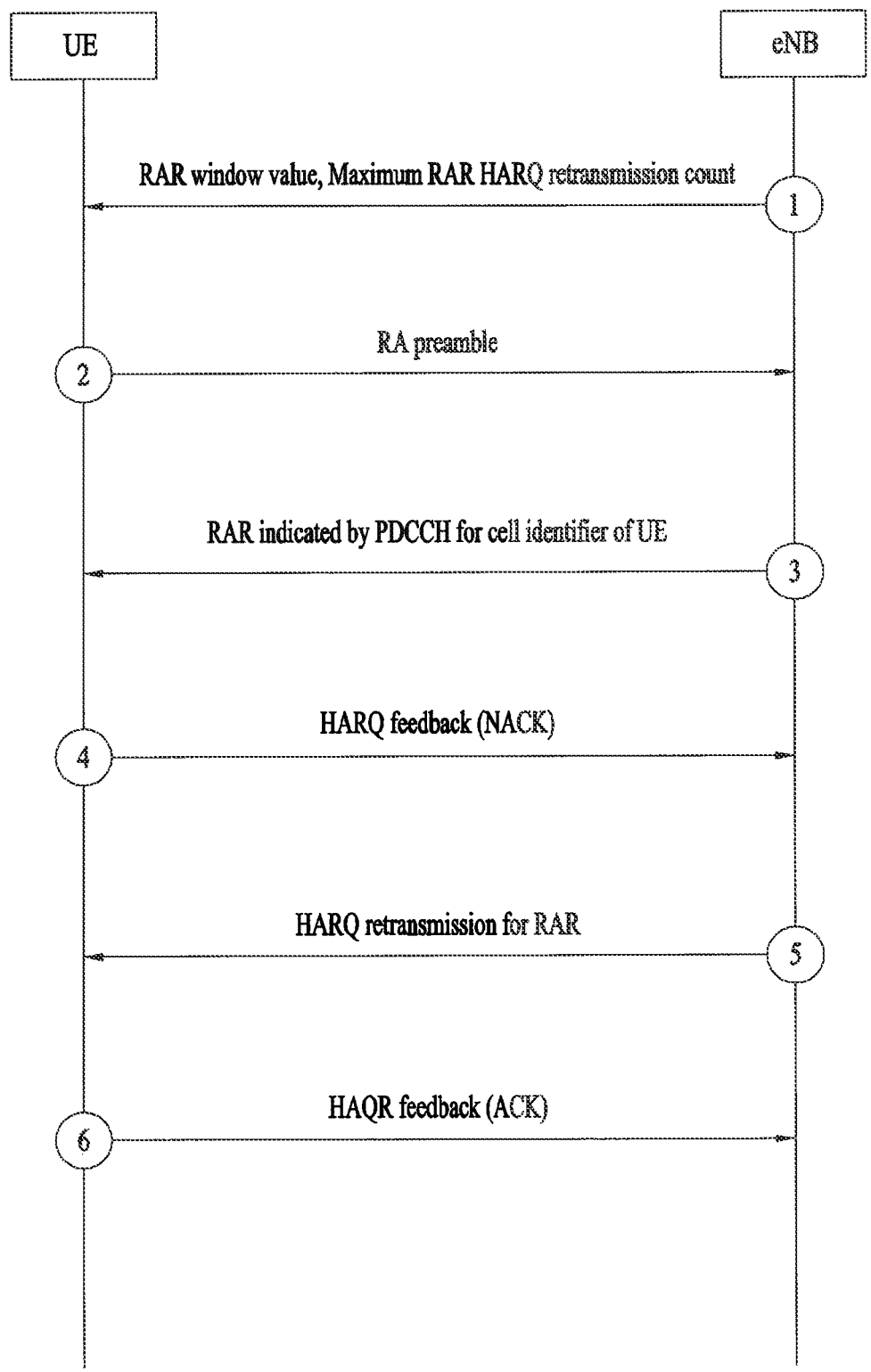
FIG. 12 is a diagram to describe operations between a user equipment and a base station according to one embodiment of the present invention.

FIG. 12 is a diagram to describe operations between a user equipment and a base station according to one embodiment of the present invention.

In a step 1, a base station can set up an RAR window value for a user equipment using an RRC signal. In this case, the RAR window corresponds to a time window used to receive an RAR of a new format proposed by the present invention. In particular, the RAR of the new format corresponds to an RAR indicated by PDCCH for a cell identifier of the user equipment, and more particularly, to an RAR received through PDSCH indicated by a DL allocation information included in PDCCH masked with a cell identifier of the user equipment. Moreover, in the step 1, the base station can set up a maximum HARQ retransmission count, which is applied when RAR is transmitted to the user equipment by HARQ, using an RRC signal.

In a step 2, the user equipment is able to transmit an RA preamble to the base station.

In a step 3, the base station can receive an RAR message including RAR MAC PDU of the type shown in FIG. 11(b). As mentioned in the foregoing description, the RAR of the new format can be indicated by the PDCCH for the cell identifier of the user equipment. In this case, the PDCCH for the cell identifier of the user equipment can include an RAR indicator and the like.

After the user equipment has received the RAR, if the user equipment fails in decoding the RAR, the user equipment can feed NACK back to the base station in a step 4.

In a step 5, the base station can retransmit the RAR by HARQ. Having received the retransmitted RAR, the user equipment is able to attempt the decoding of the RAR by HARQ scheme. For instance, the user equipment is able to attempt the decoding in a manner of combining data (e.g., the data received in the step 3) saved in an HARQ buffer and the HARQ retransmission data received in the step 5 with each other.

If the user equipment succeeds in the decoding, the user equipment can feed ACK back to the base station in a step 6.

In the example shown in FIG. 12, a random access related message (e.g., RA preamble, RAR, etc.) can be transceived on SCell.

Figure 13:
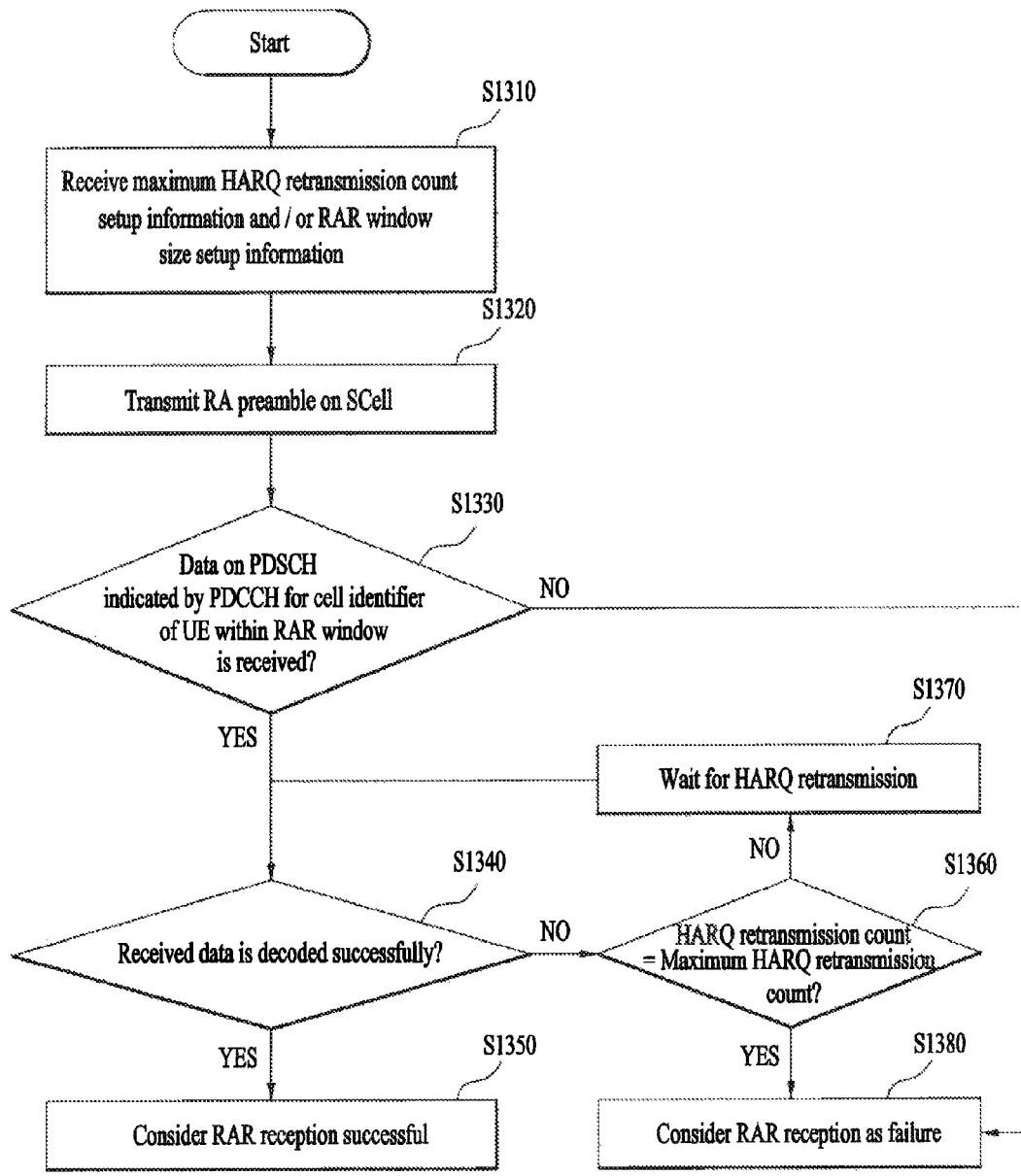
FIG. 13 is a flowchart to describe one example of an operation of a user equipment according to the present invention.

FIG. 13 is a flowchart to describe one example of an operation of a user equipment according to the present invention.

In a step S1310, a user equipment can receive at least one of a maximum HARQ retransmission count setup information and an RAR window size setup information through upper layer signaling from a base station. Such a UE-specific setup information relates to an RAR indicated by PDCCH (e.g., PDCCH masked with C-RNTI of the user equipment) for a cell identifier of the user equipment.

In a step S1320, the user equipment can transmit a random access preamble to the base station on SCell.

In a step S1330, within the RAR window, the user equipment can determine whether data (i.e., RAR MAC PDU) is received through PDSCH indicated by a downlink allocation information included in the PDCCH for the cell identifier of the user equipment. If there is no data reception within the RAR window in the step S1330, the routine goes to a step S1380 so that the user equipment considers it an RAR reception failure. On the other hand, if the data is received within the RAR window in the step S1330, the routine goes to a step S1340.

In the step S1340, the user equipment is able to determine whether the received data is successfully decoded. If the decoding is successful, the routine goes to a step S1350 so that the user equipment can consider it an RAR reception success. Meanwhile, in case of the decoding failure in the step S1340, the routine goes to a step S1360.

In the step S1360, the user equipment can determine whether a current HARQ retransmission count amounts to the maximum HARQ retransmission count set up in the step S1310. If the maximum HARQ retransmission count is reached, the routine goes to a step S1370 so that the user equipment can consider it an RAR reception failure. On the other hand, if the maximum HARQ retransmission count is not reached yet (i.e., a case smaller than the maximum HARQ retransmission count), the routine goes to the step S1370.

In the step S1370, the user equipment waits for an HARQ retransmission. If the retransmission is received, the routine goes to the step S1340. In the step S1340, the user equipment attempts decoding of the received data by HARQ scheme and is able to determine whether the decoding is successful. Depending on a result of the determination, the user equipment succeeds in the RAR reception or may enter the step S1360 again.

If a user equipment does not receive an RAR within an RAR window configured UE-specifically or an RAR maximum retransmission count reaches a maximum HARQ retransmission count, the RAR reception is considered as a failure and an RA preamble transmission can be performed again.

Thus, as an operation is performed in a manner of receiving an RAR indicated by PDCCH for a cell identifier of a user equipment by HARQ scheme, a random access procedure can be performed on a serving cell on which a monitoring for a common search space is not performed. Therefore, the user equipment performs a random access procedure on a TAG, which is constructed with SCell only, correctly and efficiently and is able to obtain time synchronization.

In the random access operation of the present invention mentioned in the foregoing description, the matters of the various embodiments of the present invention mentioned in the foregoing description are independently applicable or at least two of the various embodiments of the present invention may be simultaneously applicable. And, duplicate contents may be omitted for clarity.

Figure 14:
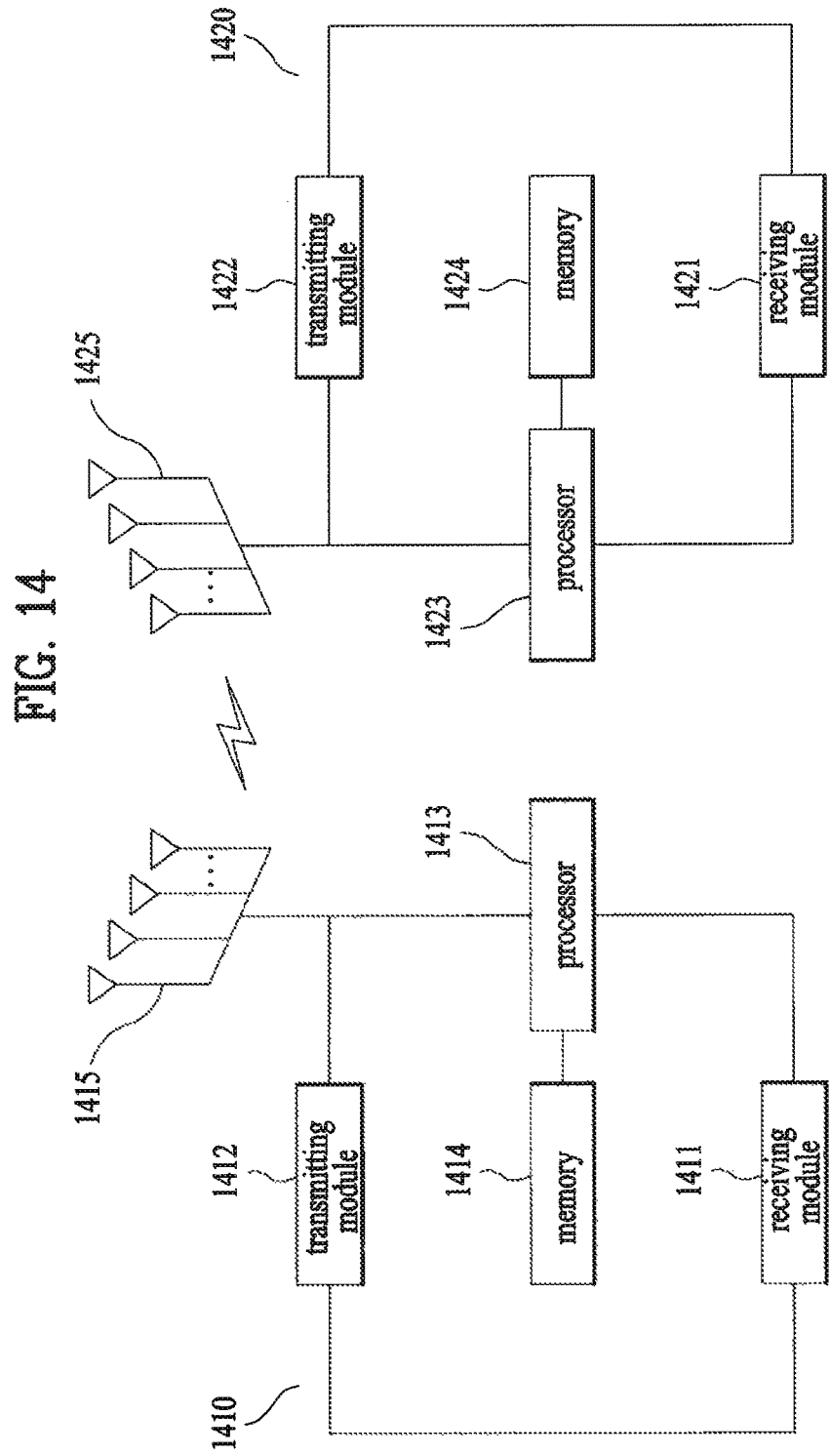
FIG. 14 is a diagram for configurations of a base station device and a user equipment device according to a preferred embodiment of the present invention.

FIG. 14 is a diagram for configurations of a base station device 1410 and a user equipment device 1420 according to a preferred embodiment of the present invention.

Referring to FIG. 14, a base station device 1410 according to the present invention may include a receiving module 1411, a transmitting module 1412, a processor 1413, a memory 1414 and a plurality of antennas 1415. In this case, a plurality of the antennas 1415 may mean a base station device that supports MIMO transmission and reception. The receiving module 1411 may be able to receive various signals, data, information and the like in uplink from a user equipment. The transmitting module 1412 may be able to transmit various signals, data, information and the like in DL to the user equipment. Moreover, the processor 1413 may be configured to control overall operations of the base station device 1410.

The base station device 1410 according to one embodiment of the present invention can be configured to support a random access procedure. The processor 1413 of the base station device 1410 may be configured to receive a random access preamble through the receiving module 1411 from the user equipment device 1420. And, the processor 1413 may be configured to transmit a random access response message indicated by PDCCH for a cell identifier of the user equipment device 1420 to the user equipment device 1420 through the transmitting module 1412 in response to the random access preamble.

The processor 1413 of the base station device 1410 performs a function of operating information received by the user equipment device, information to be externally transmitted and the like. The memory 1414 may be able to store the operated information and the like for prescribed duration and may be substituted with such a component as a buffer (not shown in the drawing) and the like.

Referring to FIG. 14, a user equipment device (UE) 1420 according to the present invention may include a receiving module 1421, a transmitting module 1422, a processor 1423, a memory 1424 and a plurality of antennas 1425. In this case, a plurality of the antennas 1425 may mean a user equipment device that supports MIMO transmission and reception. The receiving module 1421 may be able to receive various signals, data, information and the like in downlink from the base station. The transmitting module 1422 may be able to transmit various signals, data, information and the like in UL to the base station. Moreover, the processor 1423 may be configured to control overall operations of the user equipment device 1420.

The user equipment device 1420 according to one embodiment of the present invention can be configured to perform a random access procedure. The processor 1423 of the user equipment 1420 may be configured to transmit a random access preamble to the base station device 1410 through the transmitting module 1422. And, the processor 1423 may be configured to receive a random access response message indicated by PDCCH for a cell identifier of the user equipment device 1420 from the base station device 1410 through the receiving module 1421 in response to the random access preamble.

The processor 1423 of the user equipment device 1420 performs a function of operating information received by the user equipment device, information to be externally transmitted and the like. The memory 1424 may be able to store the operated information and the like for prescribed duration and may be substituted with such a component as a buffer (not shown in the drawing) and the like.

The detailed configurations of the base station device and the user equipment device mentioned in the above description may be implemented in a manner that the matters of the various embodiments (i.e., $1^{st}$ to $8^{th}$ embodiments) of the present invention mentioned in the foregoing description are independently applicable or that at least two of the various embodiments of the present invention are simultaneously applicable. And, duplicate contents may be omitted for clarity.

Embodiments of the present invention may be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The embodiments of the present invention mentioned in the foregoing description may be applicable to various kinds of mobile communication systems.

What is claimed is:

1. A method for a user equipment (UE) to perform a random access procedure, the method comprising:
    transmitting a random access preamble for a secondary serving cell (SCell) to a base station (BS);
    receiving, from the BS, a physical downlink control channel (PDCCH) including an indicator indicating that the PDCCH is for a random access response (RAR) in response to the random access preamble;
    determining that the PDCCH indicates that a physical downlink shared channel (PDSCH) includes a RAR; and
    receiving, the PDSCH from the BS, and decoding the PDSCH,
    wherein the UE determines that the PDSCH includes the RAR before receiving and decoding the PDSCH, and
    wherein the PDSCH contains downlink data.

2. The method of claim 1, wherein the RAR includes a timing advance command (TAC) and a timing advance group (TAG) identifier, but does not include a temporary cell-radio network temporary identifier (TC-RNTI),
    wherein the TAG identifier indicates a TAG to which the TAC is applied.

3. The method of claim 1, wherein the UE determines that the PDSCH includes the RAR, even if the PDSCH is not correctly decoded.

4. The method of claim 1, further comprising:
    transmitting a negative acknowledgement (NACK) for the RAR to the BS if the PDSCH is not correctly decoded.

5. The method of claim 1, wherein a window for a reception of the RAR is configured by the base station.

6. The method of claim 5, wherein a size of the window is configured user equipment-specific.

7. The method of claim 1, wherein the RAR is transmitted by the BS by using hybrid automatic repeat and request (HARQ) scheme and wherein a maximum HARQ retransmission count of the RAR is set up by the BS.

8. The method of claim 1, wherein a plurality of serving cells are configured for the user equipment and wherein the RAR is received on the SCell.

9. The method of claim 8, wherein the PDCCH is monitored in a user equipment-specific search space (USS) on the SCell.

10. The method of claim 8, wherein the random access preamble is transmitted on the SCell.

11. The method of claim 8, wherein the SCell belongs to a TAG configured with SCells only.

12. A user equipment (UE) for performing a random access procedure, the UE comprising:
    a receiving module that receives a downlink signal from a base station (BS);
    a transmitting module that transmits an uplink signal to the BS; and a processor that:
controls the transmitting module to transmit a random access preamble for a secondary serving cell (SCell) to the BS;
controls the receiving module to receive, from the BS, a physical downlink control channel (PDCCH) including an indicator indicating that the PDCCH is for a random access response (RAR) in response to the random access preamble;
determines that the PDCCH indicates that a physical downlink shared channel (PDSCH) includes a RAR;
receive, from the BS, and decode the PSDSCH,
wherein the processor determines that the PDSCH includes the RAR before receiving and decoding the PDSCH; and
wherein the PDSCH carries downlink data.

* * * * *